United States Patent [19]

Horacek et al.

[11] Patent Number: 4,546,039
[45] Date of Patent: Oct. 8, 1985

[54] PROCESS FOR BONDING LIGNOCELLULOSE-CONTAINING RAW MATERIALS WITH A PREPOLYMER BASED ON A URETHANE-MODIFIED DIPHENYLMETHANE DIISOCYANATE MIXTURE

[75] Inventors: Heinrich Horacek; Otto Wittmann, both of Frankenthal; Matthias Marx, Bad Durkheim; Johann Mayer, Freinsheim, all of Fed. Rep. of Germany

[73] Assignee: BASF Aktiengesellschaft, Ludwigshafen, Fed. Rep. of Germany

[21] Appl. No.: 489,199

[22] Filed: Apr. 27, 1983

[30] Foreign Application Priority Data

May 3, 1982 [DE] Fed. Rep. of Germany ....... 3216363

[51] Int. Cl.$^4$ .................... B32B 5/16; B32B 21/08
[52] U.S. Cl. .................... 428/357; 156/62.2; 156/331.4; 428/326; 428/425.1; 428/528; 428/529
[58] Field of Search .................. 106/123 R; 260/17.5; 526/905, 301, 302; 568/672; 156/331.4, 331.7, 62.2; 428/326, 357, 425.1, 528, 529

[56] References Cited

U.S. PATENT DOCUMENTS

| | | | |
|---|---|---|---|
| 3,919,017 | 11/1975 | Shoemaker | 156/62.2 |
| 3,930,110 | 12/1975 | Shoemaker | 428/424 |
| 3,990,928 | 11/1976 | Schmidt-Hellerau | 156/62.2 |
| 4,279,788 | 4/1981 | Lambuth | 260/9 |

OTHER PUBLICATIONS

*Handbook of Adhesives*, Skiest, Irving, 1973, pp. 333-342, p. 304, (1st paragraph).
Billmeyer, Jr., Fred; Textbook of Polymer Science, p. 345.
Kirk-Othmer, Encyclopedia of Chemical Technology, vol. 23, Urethanes.

*Primary Examiner*—Paul J. Thibodeau
*Attorney, Agent, or Firm*—Joseph D. Michaels

[57] ABSTRACT

A process for bonding lignocellulose raw materials using an isocyanate group-containing urethane-modified diphenylmethane diisocyanate mixture having a viscosity of 120 to 1000 mPas at 25° C. and an isocyanate content of 15 to 33.6 percent by weight which is obtained by reacting a diphenylmethane diisocyanate mixture containing 10 to 75 percent by weight of 2,4'-diphenylmethane diisocyanate with 0.05 to 0.5 hydroxyl equivalents of a polyol per equivalent isocyanate group.

6 Claims, No Drawings

PROCESS FOR BONDING LIGNOCELLULOSE-CONTAINING RAW MATERIALS WITH A PREPOLYMER BASED ON A URETHANE-MODIFIED DIPHENYLMETHANE DIISOCYANATE MIXTURE

BACKGROUND OF THE INVENTION

1. Field of the Invention

This invention relates to the field of aggregate and laminate compositions. Specifically, it relates to a method for bonding lignocellulose-containing raw materials with a urethane-modified diphenylmethane diisocyanate mixture.

2. Description of the Prior Art

The preparation of panels or molded parts of lignocellulose-containing fibers, chips or layers using isocyanate group-containing bonding agents, especially those containing di- and polyisocyanates is known (German Pat. Nos. 2,109,686 and 2,711,958).

Among other properties, such bonding agents are intended to improve the materials with respect to their stability and their behavior with respect to moisture.

It has been found, however, that a relatively rapid reaction of the isocyanate groups with water takes place when, for example, wood chips are bonded with known di- and polyisocyanates and/or their aqueous emulsions. This reaction is caused on the one hand by the undesirable but always present residual wood moisture and on the other hand by the use of aqueous emulsions. The effect is particularly pronounced if aqueous bonding resins based on amino and phenol plastic resins are simultaneously used. Due to their alkaline properties, they increase the reaction rate of the isocyanate groups. This results in a very narrow processing latitude as well as in frequently occurring scattering in the stability values of the materials bonded in this manner. Furthermore, in case of plant shutdowns or delays, solids can separate in the bonding agent. This results in blocking of the metering and measuring devices and plugging in the lines.

The application of 2,4'-diphenylmethane diisocyanate has been suggested for various purposes, for example, for manufacture of electrical insulation, coatings or floor coverings (German Published Applications Nos. 19 23 214, 24 47 625 and 26 23 346).

In the context of bonding agents for lignocellulose-containing products, however, there is a teaching that an amount of 2,4'-diphenylmethane diisocyanate in excess of 8 percent by weight brings about unsatisfactory results (German Pat. No. 2,711,958)

These drawbacks can be avoided if the bonding agent used is a prepolymer based on a diphenylmethane diisocyanate mixture.

SUMMARY OF THE INVENTION

A process for bonding lignocellulose-containing raw materials comprising coating and reacting the lignocellulose-containing raw material with an isocyanate group-containing prepolymer which has a free-isocyanate group content of about 15 to about 33.6 weight percent and a viscosity of 120 to 1000 mPas at 25° C. and which is prepared by reaction of about 0.05 to about 0.5 hydroxyl equivalent of
  (a) a polyol having a functionality of 2 to 8 and a molecular weight of about 62 to about 2000, per isocyanate equivalent of
  (b) a polyisocyanate mixture which contains from 0 to about 50 weight percent polyphenyl polymethylene polyisocyanate and about 50 to 100 weight percent of diphenylmethane diisocyanate isomers mixture containing about 10 to about 75 weight percent 2,4'-isomer and about 25 to about 90 weight percent 4,4'-isomer.

DESCRIPTION OF THE PREFERRED EMBODIMENTS

The diphenylmethane diisocyanate mixtures used in accordance with the method of this invention primarily contain 2,4'- and 4,4'-diphenylmethane diisocyanates with a negligibly small amount of 2,2'-isomer. Generally the content of 2,4'-diphenylmethane diisocyanate is 10 to 75 weight percent, preferably 40 to 60 weight percent. This results in a 4,4'-isomer share of 25 to 90 weight percent, preferably 40 to 60 weight percent.

Optionally, these diphenylmethane diisocyanate mixtures may contain up to 50 percent by weight of polyphenyl polymethylene polyisocyanates based on the overall mixture.

The polyols used for the urethane modification generally have a molecular weight of 62 to 2000. They usually contain 2 to 8, preferably 2 to 4, hydroxyl groups. These are primarily substances of the compound classes of multifunctional alcohols, polyether polyols or polyester polyols such as ethylene glycol, propylene glycol, trimethylolpropane, trimethylene glycol, glycerine, 1,4-butane diol and 2,3-butylene glycol, di- or triethylene glycol, di- or tripropylene glycol, polyethylene glycol, polypropylene glycol, polybutylene glycol or the polyesters of succinic acid, adipic acid, pimelic acid, sebacic acid, fumaric acid, maleic acid, phthalic acid or terephthalic acid resulting from reaction with the above-mentioned polyols. Preferably, dipropylene glycol is used.

The urethane modification is generally carried out at temperatures of 20° to 120° C. One equivalent of isocyanate is used with 0.05 to 0.5 equivalent of a polyol.

The prepolymers prepared in this manner have an isocyanate group content of 15 to 33.6 weight percent, preferably 20 to 30 weight percent. Their viscosities at 25° C. lie within a range of 120 to 1000 mPas.

According to the process of this invention, the prepolymer may also be mixed with aqueous bonding resins based on other chemical products. For example, the commonly known melamine-formaldehyde, urea-formaldehyde, and phenol/resorcinol-formaldehyde resins may be used in amounts of 10 to 90 weight percent.

Furthermore, the prepolymers employed for the process of this invention may be mixed with additional auxiliaries commonly used in practice (for example, emulsifiers or stabilizers).

Lignocellulose-containing raw materials which may be bonded according to the process of this invention include, for example, wood, bark, cork, flax, bamboo, sisal or coconut fibers. The raw materials may be used in the form of granules, chips, fibers or meal. Their moisture content is 0 to 20 weight percent, preferably 3 to 10 weight percent.

According to the process of this invention, 1 to 100 weight percent, preferably 2 to 12 weight percent of the prepolymers based on the mass of the raw materials are added to the raw materials. The pressing into panels or molded parts normally takes place by the application of heat and pressure.

In an analogous manner, multi-layer panels or molded parts of veneers, papers or fabrics may be produced. The preparation of multi-layer panels or molded parts of veneers, strip, rod or rod center layers can be implemented with the process of this invention. As described above, the veneers are treated with the prepolymer and are subsequently compressed with the center layers. This work is commonly carried out under increased pressure and at higher temperatures. As a rule, the initial pressure varies between 5 and 50 bar. During the course of the pressing procedure, the pressure usually drops. Preferred pressing temperatures are 100° C. to 250° C.

The above-mentioned prepolymers can also be generally used as a bonding material in the wood industry, for example, for bonding veneers or other panels. The quality of lignocellulose-containing materials, particularly of solid wood, can be improved by filling and bonding internal hollow spaces with the prepolymer.

Use of the process of this invention lengthens the potential processing period by approximately 30 percent. This is understood to be that period of time within which the treated lignocellulose-containing raw materials can be processed without impairment of the final stability.

The initially mentioned rapid reaction of the isocyanate groups with water, especially when accompanied by the use of amino and/or phenol plastic resins, is greatly slowed by the process of this invention. Based on titrimetric determinations, it was found that the aqueous emulsions of the prepolymers used with the process of this invention still show 90 to 95 percent of their original isocyanate content after 24 hours.

In bonding agents which had no or only a slight amount of 2,4'-diphenylmethane diisocyanate, these values were 27 to 63 percent.

As a result of the urethane modification of diphenylmethane diisocyanate with a high component of 2,4'-isomers, prepolymers with optimum functionality are obtained. The resultant favorable viscosity values in turn have an advantageous effect upon the quality and service life of the bonding. Thus, this method permits preparation of panels or molded parts of high mechanical quality without exceeding the pressing times normally used in practice.

EXAMPLE 1

Urethane Modification

In a reactor fitted with a feed tank, an agitator, and a means for heating, 90.2 parts of a diphenylmethane diisocyanate mixture with a 2,4'-isomer content of 45 percent by weight were charged. While purging with nitrogen and agitating, the charge was heated to 90° C. During a period of 30 minutes, 9.8 parts of dipropylene glycol were added. Subsequently, the reaction mixture was agitated at 90° C. for two hours.

After cooling, the prepolymer produced in this manner showed the following characteristics: isocyanate content: 24.7 percent; viscosity (25° C.): 670 mPas.

EXAMPLES 2, 3, 4, 5 AND 6

The procedure of Example 1 was repeated except for the variation in the polyol used as shown in Table I.

TABLE I

| Example | Polyol Used Parts | Polyol Used Identity | Prepolymer % NCO | Prepolymer Visc., mPas (25° C.) |
|---|---|---|---|---|
| 2 | 10 | DPG(1) | 23.3 | 1000 |
| 3 | 8 | DPG(1) | 26.0 | 250 |
| 4 | 16 | PPG 2000(2) | 25.0 | 120 |
| 5 | 14 | PPG 500(3) | 26.0 | 120 |
| 6 | 7 | TMP(4) | 25.0 | 200 |

(1)dipropylene glycol
(2)2000 molecular weight polypropylene glycol
(3)500 molecular weight polypropylene glycol
(4)trimethylolpropane The prepolymers were used as prepared or as aqueous emulsion. The emulsions were produced as follows:

EXAMPLE 7

Preparation of an Aqueous Emulsion

Using an Ultra Turrax agitator, model T 45 N (IKA Works), 50 parts of urethane-modified isocyanate compositions of the previous examples were emulsified within a period of 10 minutes with 50 parts of water containing 9.23 percent by weight of a polyether polyol and 0.77 percent by weight of polyvinylpyrrolidone.

Using the above described binders, bonding tests were carried out with coniferous wood chips.

EXAMPLE 8

Bonding Tests

Five and one-half parts of coniferous wood chips with a chip moisture of 3 to 6 percent by weight and in each case 4.5 percent by weight of the bonding agent based on the mass of the wood chips were combined in the mixer and mixed until the bonding agent was well distributed.

The coated chips were poured into a panel mold and compressed in a heated press with a press time of approximately 12 seconds per milimeter of panel thickness and a press temperature of 180° C. An average panel density of 650 kilograms per cubic meter was achieved, the panel having a thickness of 18 milimeters.

The following mechanical data (Table II) were determined (based on an isocyanate content of 24 percent by weight in the bonding agent):

TABLE II

| Isocyanate Used, Product of Example | Shear Resistance V 20(a) (N/mm$^2$) | Shear Resistance V 100(b) (N/mm$^2$) |
|---|---|---|
| 1 | 2.14 | 1.00 |
| 2 | 2.50 | 1.04 |
| 2 (50% aqueous emulsion) | 2.60 | 1.01 |
| 3 | 2.21 | 0.93 |
| 3 (50% aqueous emulsion) | 2.56 | 1.01 |
| Comparison Products(c) | | |
| A | 2.15 | 0.91 |
| A (50% aqueous emulsion) | 2.40 | 1.03 |
| B | 2.19 | 1.0 |

(a)Shear resistance V 20: Average value of 10 individual measurements determined on test samples having dimensions of 5 × 5 cm; after adjusting a temperature of 20° C. and 60 percent relative humidity.
(b)Shear resistance V 100: Average value of 10 individual measurements determined on test samples having dimensions of 5 × 5 cm; after being stored in boiling water for two hours and cooling in water at 20° C. for one hour.
(c)Comparison products A and B are diphenylmethane diisocyanate mixtures containing 7 and 0 percent by weight of 2,4'-isomers, respectively, and having viscosities of 270 and/or 700 mPas at 25° C., respectively.

The embodiments of the invention in which an exclusive privilege or property is claimed are defined as follows:

1. In the process for bonding lignocellulose-containing raw materials by the process comprising (1) coating the lignocellulose-containing raw material with a bonding agent and (2) reacting and curing the mixture at elevated temperature and pressure, the improvement comprising employing as bonding agent an isocyanate group-containing prepolymer which has a free isocyanate group content of about 15 to about 33.6 weight percent based on the weight of prepolymer and having a viscosity of 120 to 1000 mPas at 25° C. which prepolymer is prepared by reacting at about 20° C. to about 120° C. about 0.05 to about 0.5 hydroxyl equivalent of (a) a polyol having 2 to 8 hydroxyl groups and a molecular weight of about 62 to about 2000 per isocyanate equivalent of (b) a polyisocyanate mixture which contains 0 to about 50 weight percent polyphenyl polymethylene polyisocyanates and about 50 to 100 weight percent of diphenylmethane diisocyanate isomer mixture based on total weight of polyisocyanate mixture, said diphenylmethane diisocyanate isomer mixture containing about 10 to about 75 weight percent 2,4'-isomer and about 25 to about 90 weight percent 4,4'-isomer based on the weight of diisocyanate.

2. The process of claim 1 wherein the polyol used to prepare the prepolymer is dipropylene glycol.

3. The process of claim 1 wherein the prepolymer is used in admixture with from about 10 to about 90 percent by weight of additional bonding agents selected from the group consisting of (a) melamine-formaldehyde resins (b) urea-formaldehyde resin (c) phenol-formaldehyde resin (d) phenol/resorcinol-formaldehyde resin.

4. The bonded lignocellulose product obtained by the process of claim 1.

5. The bonded lignocellulose product obtained by the process of claim 2.

6. The bonded lignocellulose product obtained by the process of claim 3.

* * * * *